United States Patent [19]
Fischer

[11] Patent Number: 5,894,632
[45] Date of Patent: Apr. 20, 1999

[54] ENERGY STORING SPRING JOINT

[76] Inventor: Friedrich Fischer, Allermöher Deich 35, 21037 Hamburg, Germany

[*] Notice: This patent is subject to a terminal disclaimer.

[21] Appl. No.: 08/820,952

[22] Filed: Mar. 19, 1997

Related U.S. Application Data

[62] Division of application No. 08/500,939, filed as application No. PCT/EP94/00157, Jan. 21, 1994, Pat. No. 5,634,241.

[30] Foreign Application Priority Data

Jan. 23, 1993 [DE] Germany ............... 9300903 U

[51] Int. Cl.⁶ .............................. E05F 1/14; E05C 17/64
[52] U.S. Cl. ................ 16/285; 16/307; 16/342; 16/374; 403/111
[58] Field of Search .................. 16/72, 63, 75, 16/76, 77, 307, 285–286, 297–300, 325, 328–330, 374, 342, 78; 49/386; 403/166, 145, 146, 148, 111

[56] References Cited

U.S. PATENT DOCUMENTS

| | | | |
|---|---|---|---|
| 172,935 | 2/1876 | Reynolds | 16/77 |
| 392,667 | 11/1888 | Devore | 16/77 |
| 414,367 | 11/1889 | Baude | 16/77 |
| 634,854 | 10/1899 | McKee | 16/77 |
| 2,079,054 | 5/1937 | Vadasz | 16/77 |
| 2,312,638 | 3/1943 | Gedris . | |
| 2,441,455 | 5/1948 | Tetzman | 16/76 |
| 3,018,507 | 1/1962 | Launer | 16/78 |
| 3,332,638 | 7/1967 | Jessup et al. | 16/63 |
| 3,335,454 | 8/1967 | Dunster, Jr. . | |
| 3,898,708 | 8/1975 | Gwozdz . | |
| 3,903,567 | 9/1975 | Suska . | |
| 3,978,551 | 9/1976 | Mochizuki . | |
| 4,783,882 | 11/1988 | Frolov . | |
| 5,037,231 | 8/1991 | Kitamura . | |
| 5,109,571 | 5/1992 | Ohshima et al. . | |
| 5,205,015 | 4/1993 | Huang . | |

FOREIGN PATENT DOCUMENTS

| | | | |
|---|---|---|---|
| 3602131-A1 | 7/1987 | Germany . | |
| 18553 | 11/1890 | United Kingdom | 16/76 |

*Primary Examiner*—Chuck Y. Mah
*Attorney, Agent, or Firm*—Harness, Dickey & Pierce, P.L.C.

[57] ABSTRACT

An energy storing spring joint (100) for use between two parts movable with respect to each other and joined by the energy storing spring joint is capable of storing energy in such a way that energy is stored in a displacement path and is released in very precise and predetermined manner, with a variable force over the path of displacement, when the parts move in the opposite or backward direction in the path of displacement. At least one energy storing member (50) or at least two energy storing members (50) connected sequentially or at least two different energy storing members (50) connected in parallel are mounted in or on the energy storing spring joint (100) and may be moved by or loaded with energy when one of both parts (30, 40) is moved relative to the other part. The energy storing member(s) (50) may be locked against releasing their energy.

1 Claim, 2 Drawing Sheets

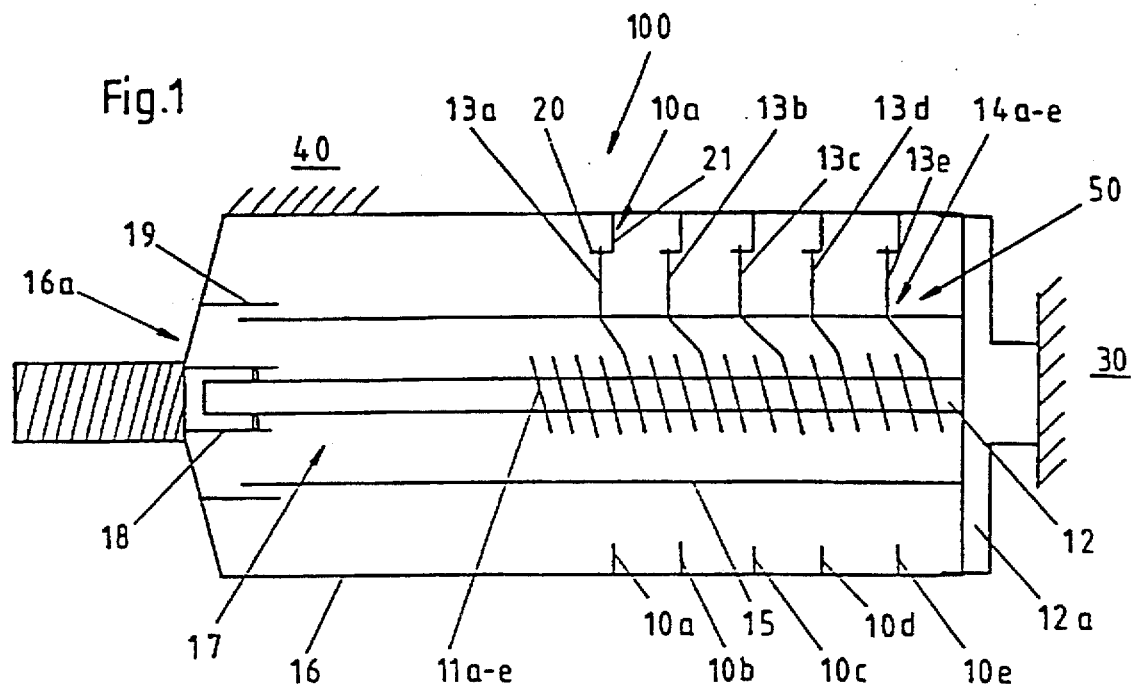
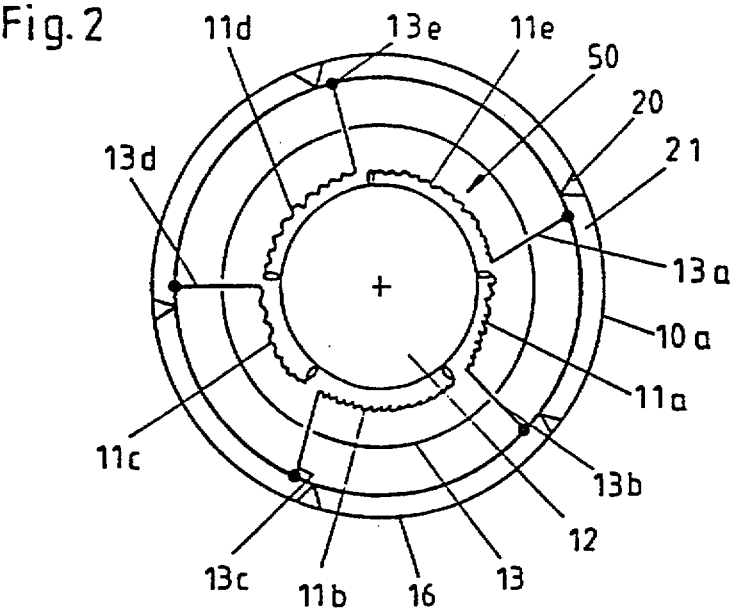

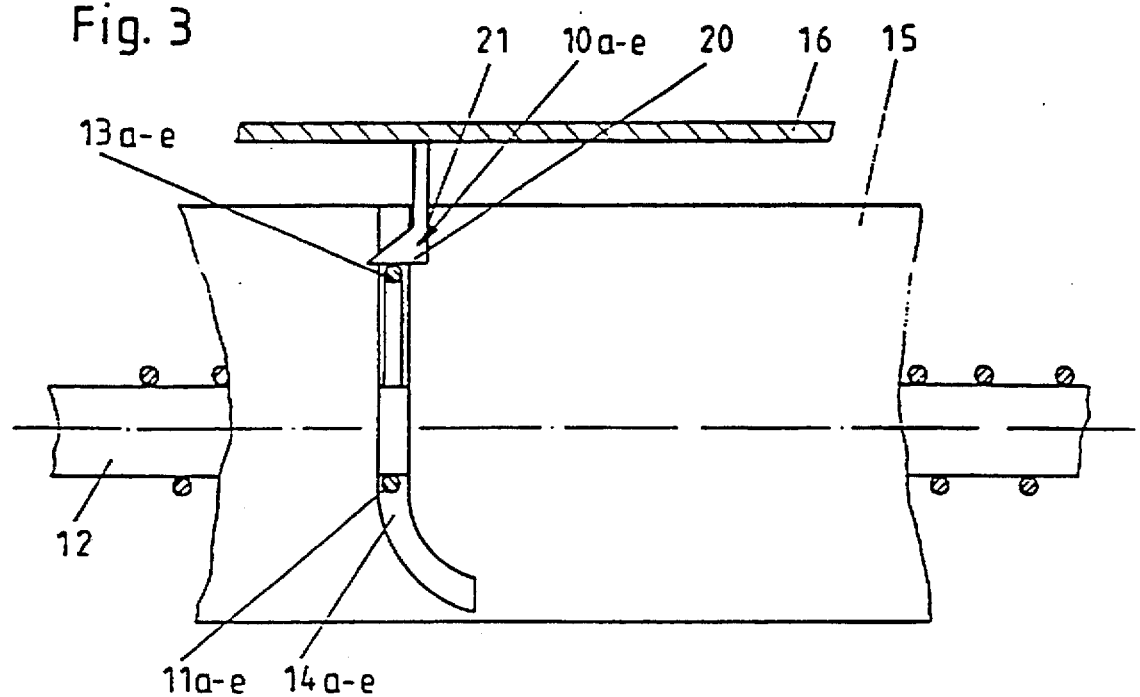
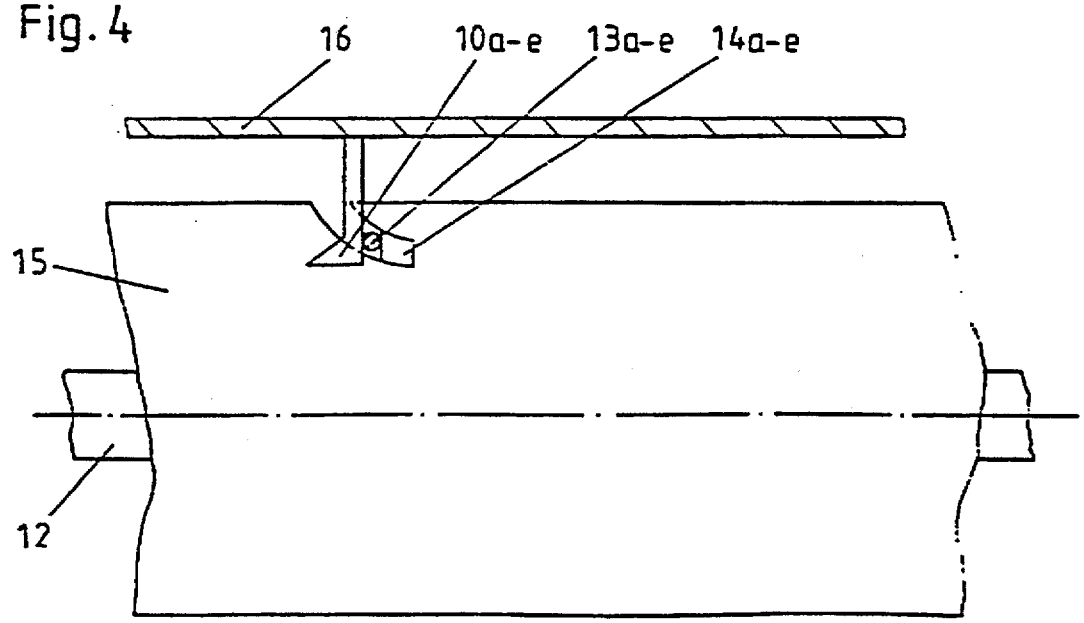

ENERGY STORING SPRING JOINT

This is a division of United States patent application Ser. No. 08/500,939, filed Jul. 21, 1995 now U.S. Pat. No. 5,634,241, which is a U.S. national phase filing of PCT application No. PCT/EP94/00157, filed Jan. 21, 1994 which is based on German application No. G 9300903.2, filed Jan. 23, 1993.

BACKGROUND AND SUMMARY OF THE INVENTION

The energy storing spring joint can be used wherever two parts can be moved in a rotary motion relative to each other. This can involve situations where one part is fixed or where both parts rotate in opposite directions or at different speeds with respect to each other.

The invention concerns an energy storing spring joint for storing energy, which is to be used between two parts which are moveable relative to each other, and which are joined by the energy storing spring joint.

Devices for storing energy, work and power are known in the most varied embodiments. Thus, spring mechanisms for clocks or spring driven motors for toys are also known. With these devices, for example, the energy which is added to the energy storing device by applying a force to it can be stored and once again released.

These known energy storing devices most often release the energy continuously or with decreasing intensity. However, there are examples of applications, where it is desirable to use an energy storing device, which delivers the energy on a predetermined basis and/or according to demand at varying levels of intensity as a function of its displacement or as a function of time.

Hinges for vehicles represent an especially suitable area of application.

Trailers of trucks or in the area of agricultural equipment include loading gates, which are linked to the trailer by means of simple hinges. The hinges are frequently installed at the lower edge of the loading gate, so that when they are manually opened or closed, a considerable physical effort must sometimes be made to move the gate, and during this effort the required application of force is naturally greatest, when the angle between the loading gate and a vertical plane is 90°.

It is, therefore, the objective of the invention to create an energy storing spring joint of the type initially described, which can store energy in such a manner, that it is possible to store energy during a movement along a given path in such a way, that in the case of a movement in an opposite direction or during a reversal of the motion, the energy can be released in a very definite, predetermined manner along the path of motion, and where the amount of energy released can be varied as a function of displacement.

The objective is achieved by the characteristics described in claim 1.

An essential idea on which this objective is based, is that the forces being generated during the relative movement of two parts with respect to each other, such as weight forces, forces due to the kinetic energy to be absorbed etc., must be counteracted and stored in the energy storing device in the form of potential energy. In order to be able to release the energy subsequently on a continuous basis, it is contemplated that it will be stored in at least one energy storing device or in two energy storing devices, which are independent of each other. These devices can be charged with potential energy one after the other, or energy storing devices, which differ from each other may be employed, in which energy is accumulated in parallel. Both systems can also be combined. It is important that an energy release, for example in order to support the movement of the parts toward each other, can be facilitated while motion takes place, and in particular, in accordance with the invention, on the basis of a definitive, predeterminable process of the release of energy. This means that, for example, at the start of the movement only a small amount of energy is being taken from the energy storing device or devices, or that an especially large amount of energy is extracted from a force, and that subsequently a removal of energy occurs on a different level of energy, which may, under certain circumstances, change once again.

Preferably, it is contemplated that the energy storing devices are made of springs. According to the invention, these springs are either connected in series in such a manner that in each of them, one after the other, the entire possible amount of energy is being stored, while the energized springs are kept in their energized condition or under tension, as the case may be, until all the springs have been energized. A further basic idea consists in preventing or blocking the energy storing device or devices against a release of their energy in such a manner, that a further movement of the two parts toward each other is still possible. It is, therefore, possible to provide a still further movement of the parts, during which no further storage of energy takes place. Then, during the return movement of the parts, the discharge of energy takes place at a time that can be predetermined and/or at points along the path, which can be determined in advance.

In this context, it can be arranged that at least two springs have different spring constants or that one different spring has properties such as a progressive or degressive change of the spring constants along the path of motion of the spring, and/or that the energy storing devices, during the movement of the parts toward each other, can all be energized along the entire path of movement, and that they can all be de-energized along a combined path of movement in the opposite direction. For this purpose, the springs may be constructed as tension springs, compression springs, spiral springs or torsional springs, and they can be designed and selectively positioned in such a manner that they can be adjusted with regard to their initial tension.

A very particular objective consists in creating an energy storing spring joint, which can store energy in such a manner, that the opening and closing of, for example, loading gates can be assisted in such a way, that as a result only minimal forces need to be applied, while the extent of the assistance can be varied.

This objective is achieved by the characteristics identified in claim 7.

For this purpose, it is contemplated, in accordance with the invention, to create a spiral spring system, which is equipped with several spiral springs, which have varying spring constants, and which store the energy being generated during the lowering of the gate, so that this energy can be utilized to assist while the gate is being raised, and for which system an area of use is found wherever two parts, which are connected to each other, must be pivoted relative to each other while a force is being applied. However, it would be advantageous if the force of gravity could be utilized in one of the directions of rotary motion.

Such a spiral spring system for, for example, a hinge for a gate, consists of a cover tube, which is closed at one end and which constitutes an enclosure sleeve, which has been provided with a fastening means, which is attached to the gate of the trailer.

In the cover tube, which forms an enclosure sleeve, the hinge of the trailer contains several spiral springs, through which a shaft is extended, which is attached to the trailer. The spiral springs are also attached to the shaft, and they are supported by the impact member of the catchment device at the inside of the cover tube. Between the cover tube, which forms the enclosure sleeve, and the spiral spring, there is a guide sleeve which is rigidly attached to the trailer and which contains guide slots and functions in such a way that one free end of a spiral spring is always being guided in a guide slot in such a manner that it can be picked up by a cam of the catchment device. If the gate is now operated, the cover tube is rotated and, as a rule, places the spiral springs under tension, one after the other, due to the action of the catchment device, the free ends of which (the spiral springs) thus are induced to continue to move through the guide slots of the guide sleeve, and they do so specifically by moving along the main portion of the guide slot, which is approximately perpendicular to the shaft. The end portions of the guide slots proceed approximately parallel to the shaft. By being displaced into the end section, the end of the spiral spring is guided away from the region of the catchment device and is placed in a storage position, in which it cannot be further tensioned, but in which the current tension can be maintained. The catchment device, which has the shape of a bead and is disposed in the form of a partial circumferential ring on the inside of the enclosure sleeve, then slides, along with the impact member, past the end of the spiral spring, which has been pushed away toward the end portion of the guide slot, and the free end is kept in its position, while it slides along a lateral glide path of the catchment device, even if the enclosure sleeve is rotated further. If this motion is carried out in the opposite direction, i.e the gate is being closed, then the spring slides out of its storage position, after the impact portion of the catchment device has been rotated past the end of the spiral spring while it was being turned back, because it pushes through the space, which has been generated in the end region, into the region of the cam of the catchment device, and then pushes against the impact portion of the catchment device, by which action the closing process is assisted. The spring constant and the disposition of the cams and the slots are chosen in such a way, that they are adapted to the energy use pattern during the closing of the gate.

In this context, it can also be arranged that the catchment device extends through 360° or more an the inside of the cover tube. In this case, the bead must not be positioned at a right angle with respect to the shaft, but must proceed in a spiral pattern in the form of a kind of bead-like thread, in which case the pitch of the bead-like thread and the length of the end portion of the guide slot must be adjusted to each other in such a manner, that when the end of the bead of the catchment device has been reached, the free end of the spring is located in the end portion of the end section.

The impact surface of the impact member is positioned at an angle relative to the longitudinal extension of the catchment device in such a way, that the free end of the spiral spring positions itself in such a manner that it positions itself against a wall of the guide slot at the same time that it is forced by it due to the interaction with the impact surface, into the end region of the guide slot.

This system of spiral springs can be used in many different ways in all areas, in which spiral springs are needed, while, by the selection of the spring constants and the positioning of the cams of the catchment device, or as the case may be, the guide slots, an individual adaptation is always possible.

In this context, it is especially advantageous, that the direction of effective action for the storage of energy in both directions of motion can be accommodated by an appropriate placement of the guide slots and the spiral springs.

By selecting and employing springs with different spring constants, and by choosing spring constants which change along the path of tensioning, it becomes also possible to absorb different forces, for example varying weight forces, which may be generated along the rotary path of motion of a hinge, so that an easy moveability can be achieved.

Further advantageous embodiments are characterized in the sub-claims.

BRIEF DESCRIPTION OF THE DRAWINGS

An example embodying the invention is explained below in greater detail by referring to the drawings. They show the following:

FIG. 1 In a partial section of a side view, a spiral spring system in accordance with the invention is shown in the form of the hinge of a gate.

FIG. 2 In a cross-section, a spiral spring system in accordance with the invention is shown in the form of the hinge of a gate.

FIG. 3 A partial section of a side view of a detail of a spiral spring with guide slots and catchment devices is shown in a state of slackness, and FIG. 4 a partially sectioned side view of a detail of the spiral spring with a guide slot and a catchment device is shown in a tensioned state.

DETAILED DESCRIPTION OF THE PREFERRED EMBODIMENT

FIG. 1 shows a spiral spring system in accordance with the Invention in the form of a gate hinge 100, e.g. a trailer for trucks, in which the cams 10a–e of the catchment device for spiral springs 11a–e are shown in a single plane for the sake of simplicity and ease of visualization.

The gate hinge 100 contains a shaft 12, which is attached to a part 30, e.g. the trailer, which is only hinted at in the drawing, and which shaft is extended through several spiral springs 11a–e, and to which shaft the spiral springs 11a–e are attached at one end. The free ends 13a–e of the spiral springs 11a–e are extended through the guide slots 14a–e of a guide sleeve 15, where the guide sleeve 15 is immovable with respect to shaft 12, because both are joined to each other by a fastening means 12a, which is also used for attaching it to the trailer. The shaft 12, the spiral springs 11a–e and the guide sleeve 15 are located in an enclosure sleeve 16, one side of which is closed off. The enclosure sleeve is attached to a second part 40, e.g. the gate of the trailer, At its closed side 16a, there are located on the inside 17 of the enclosure sleeve 16 a guide portion 18 for the shaft 12 and a guide ring 19 for the guide tube 15. On the inside 17 of the enclosure sleeve 16, there are located the catchment devices 10a–e. which may also be constructed as cams and which exert a force against the free ends 13a–e of the spiral springs 11a–e, when the enclosure sleeve 16 goes through a turning motion relative to the shaft 12.

In FIG. 2, the gate hinge 100 is shown as a cross-section, in order to demonstrate a possible arrangement of the catchment devices 10a–e.

FIG. 3 and FIG. 4 explain the modus operandi, or as the case may be, the storage of the spring energy by means of the particular interaction of the catchment devices 10a–e and the guide slots 14a–e. The guide slots 14a–e proceed at a right angle to the shaft 12 in the guide sleeve 15, while their end portion terminates by being bent to the side at nearly a right angle. The straight section of the guide slots 14a–e extends along a path congruent to that of the catchment devices 10a–e for the spiral spring 11a–e, while the end region serves to guide the free end of the spiral spring 11a–e away from the impact area of the cam of the catchment device 10a–e. When the shaft 12 is rotated relative to the enclosure sleeve 16 in a direction X, each catchment device 10a–e exerts a force against one end of a spiral spring 11a–e, which causes it (the spiral spring) to be tensioned. While this takes place, the end of the spiral spring moves along the straight section of the guide slot and the angled end is rotated into a position (FIG. 4), in which the spring cannot release the energy again, because the spiral spring 11a–e is firmly held in this position by the guide slot 14a–e and by the outside of the catchment device 10a–e, which moves around the inside 17 of the enclosure sleeve 16.

It is further contemplated, that the catchment devices (10a–e) are constructed as bead-like or fin-like partial rings or threaded rings, which are extended on the inside (17) of the enclosure sleeve (16), and each of which is equipped with an impact member (20) for exerting a force on the free end (13a–e) of a spiral spring (11a–e) as well as with a lateral glide path (21). It is possible to use the same basic structure and, in the place of each catchment device, to generate a guide surface in the enclosure sleeve in the form of a guide slot in such a way, that an appropriate guidance of the free end of the spring is accomplished. It is also possible to set up this arrangement in a kinematic reversal. For this, the springs can be permanently supported in the enclosure sleeve, the angled free end can be extended through the guide slot in the guide sleeve, and the end region can be disposed in the area of a catchment device or guide slot, which is formed on the shaft. Preferably, it is also possible to build the joint with only one suitably constructed spring.

I claim:

1. An energy storing device (100) for connecting two parts (30, 40) which are movable with respect to each other comprising a base part (12) connected to one of said two parts (30, 40), an enclosure part (16) connected to the other of said two parts, which are connected by at least one energy storing means (50), wherein a free end of said energy storing means can be selectively caught and released by a catchment device associated with one of the enclosure part (16) and the base part (12) when one of said two parts (30, 40) is moved relative to the other part, and a guiding means (15) connected to one of the enclosure part (16) and the base part (12) for guiding the free end of said energy storing means (50), characterized in that the guiding means (15) comprises a guide surface (14a–14e) for guiding the free end interacting with the catchment device (20) in such a manner that a predetermined force over the path of displacement is varied as one of said two parts (30, 40) is moved relative to the other part.

* * * * *